(12) United States Patent
Gorham et al.

(10) Patent No.: US 8,154,244 B1
(45) Date of Patent: Apr. 10, 2012

(54) POWER MANAGEMENT OF DEVICE WITH MODULAR COMPONENTS

(75) Inventors: Ryan M. Gorham, Prairie Village, KS (US); Geoffrey S. Martin, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 568 days.

(21) Appl. No.: 12/340,175

(22) Filed: Dec. 19, 2008

(51) Int. Cl.
*H02J 7/00* (2006.01)
(52) U.S. Cl. .......................... 320/103; 320/114; 320/115
(58) Field of Classification Search .................. 320/103, 320/107, 114, 115, 132; 713/300
See application file for complete search history.

(56) References Cited

U.S. PATENT DOCUMENTS

| | | | | |
|---|---|---|---|---|
| 7,548,767 | B2 * | 6/2009 | Kim et al. | 455/574 |
| 7,953,459 | B2 * | 5/2011 | Kim et al. | 455/574 |
| 8,063,609 | B2 * | 11/2011 | Salasoo et al. | 320/134 |
| 2007/0103110 | A1 * | 5/2007 | Sagoo | 320/109 |
| 2008/0129251 | A1 * | 6/2008 | Lam et al. | 320/149 |

* cited by examiner

*Primary Examiner* — Richard V Muralidar

(57) ABSTRACT

A method, system, and medium are provided for managing power in an electronic device to enhance battery performance. One aspect includes automatically accelerating discharge of a battery below a threshold prior to recharging the battery. Another aspect includes measuring power requirements of modular components to create an order for use in power distribution. For example, a modular component with a highest power requirement might be charged first. In another example, power might be transferred first from a modular component with a lowest power requirement.

7 Claims, 4 Drawing Sheets

POWER MANAGEMENT OF DEVICE WITH MODULAR COMPONENTS

SUMMARY

An electronic device often includes a primary battery and modular components having separate batteries. Where such batteries are rechargeable, managing power can lead to better battery performance. For example, managing power can help reduce battery memory effects and can help distribute power according to demands of the electronic device and modular components.

Embodiments of the invention are defined by the claims below, not this summary. A high-level overview of various aspects of the invention are provided here for that reason, to provide an overview of the disclosure, and to introduce a selection of concepts that are further described below in the detailed-description section. This summary is not intended to identify key features or essential features of the claimed subject matter, nor is it intended to be used as an aid in isolation to determine the scope of the claimed subject matter.

In a first aspect, a set of computer-useable instructions are directed to managing power of an electronic device that includes a primary battery. Managing power might include monitoring a first power level of a primary battery. Moreover, incident to the occurrence of an event, the primary battery might be automatically discharged in an accelerated fashion. Once it is detected that the first power level has dropped to a threshold, the primary battery is recharged.

In another aspect, a set of computer-useable instructions are directed to managing power of an electronic device that includes a primary battery and that is adapted to be coupled to one or more modular components. Managing power might include monitoring a first power requirement of a first modular component and monitoring a second power requirement of a second modular component. In addition, a determination is made that the first power requirement is greater than the second power requirement. Accordingly, power is transferred to the first modular component battery before it is transferred to the second modular component battery.

In a further aspect, a set of computer-useable instructions are directed to managing power of an electronic device that includes a primary battery and that is adapted to be coupled to one or more modular components. Managing power might include monitoring a first power requirement of a first modular component and monitoring a second power requirement of a second modular component. In addition, a determination is made that the first power requirement is greater than the second power requirement. Accordingly, power is transferred from a second battery of the second modular component to the primary battery before power is transferred from a first battery of the first modular component to the primary battery.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Embodiments of the present invention provide systems and methods relating to managing power in an electronic device, such as an electronic device that includes a primary battery and that is adapted to be coupled to a modular component. Modular components often include a separate power source, e.g., battery, which is chargeable from the primary battery when the modular component is coupled to the electronic device. In order to condition batteries for longer charge capacities, aspects of the invention include discharging power levels of batteries in an accelerated fashion before recharging. In other aspects of the present invention, batteries are prioritized for various power management determinations, such as order in which batteries should be charged and depleted.

Some of the wording and form of description is done so herein to meet applicable statutory requirements.

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
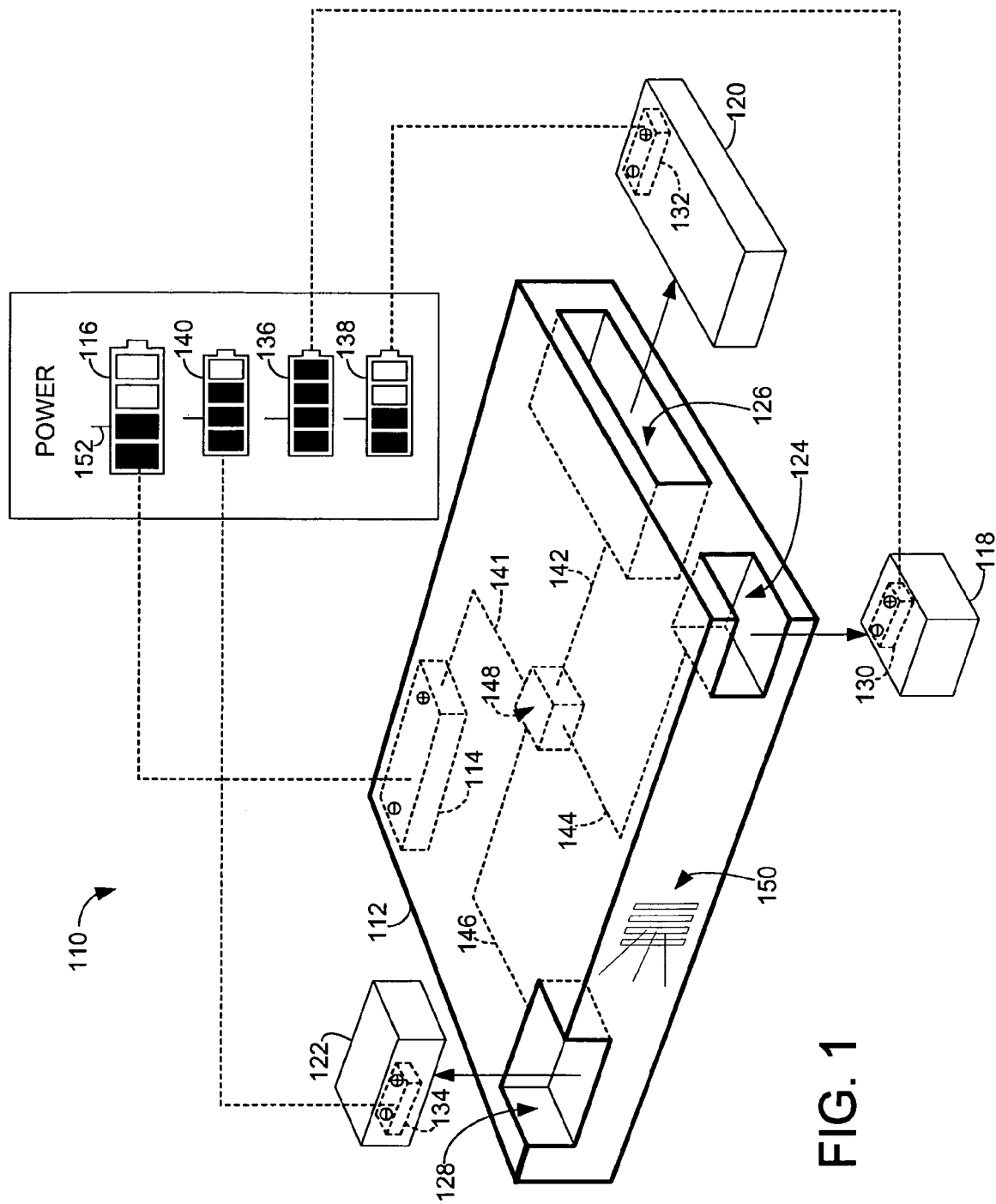
FIG. 1 depicts an illustrative operating environment in accordance with an embodiment of the present invention.

Turning now to FIG. 1, an illustrative operating environment suitable for practicing an embodiment of the technology is provided and identified generally by numeral 110. FIG. 1 includes an electronic device 112 having various components. Electronic device 112 might include a variety of devices, such as laptop computing device, tablet computing device, notebook computing device, handheld computing device, personal digital assistant, and mobile phone. In aspects of the invention, electronic device 112 includes a primary battery 114 and at least one modular component, such as modular components 118, 120, and 122.

Primary battery 114 might include a variety of battery types. For example, in an exemplary embodiment, primary battery 114 includes a rechargeable battery. "Rechargeable battery" describes a battery that can both transfer power to another component (e.g., electronic device, modular component, and battery) and receive a transfer of power from another power source to replenish power that has been discharged. Often, rechargeable batteries experience "battery memory" or "memory effect" such as when a battery holds less charge over a period of time. Primary battery 114 is shown in a ghost view because in aspects of the invention primary battery 114 is housed inside electronic device 112; however, in other aspects primary battery 114 might also be arranged external to electronic device 112.

Primary battery 114 stores power and at any instant includes a power level, which is the amount of power stored in primary battery 114. Power level icon 116 is linked to primary battery 114 and provides a visual depiction of a power level of primary battery 114. Power level icon 116 is divided into quarters, wherein a shaded quarter represents power stored in primary battery 114 and a nonshaded quarter represents power that has been depleted or discharged from primary battery 114. Although power level icon 116 shows quarters either completely shaded or completely unshaded, a quarter might also be partially shaded so as to depict a nonquarterly fraction or percentage of the primary battery's power level. Power level icon 116 represents just one manner of illustrating power levels of a battery. Other manners might include a depiction of different shapes with various divisions or simply providing a specific percentage.

In other aspects of the technology, electronic device 112 includes at least one modular component, such as modular components 118, 120, and 122. Modular components 118, 120, and 122 include peripheral devices that are used in conjunction with or as an accessory to electronic device 112. Modular components might serve various functions, such as facilitating input to and output from electronic device 112. Types of modular components 118, 120, and 122 vary depending on the type of electronic device. For example, in a tablet computing device, modular components 118, 120, and 122 might include an optical mouse, a keyboard, a lighted stylus, and a speaker pod. In a personal digital assistant, modular components 118, 120, and 122 might include a headset and miniremote. Although modular components 118, 120, and 122 are illustrated as various sized blocks, in aspects of the invention modular components 118, 120, and 122 include various shapes and sizes corresponding to whatever form is dictated by a peripheral device.

Modular components 118, 120, and 122 include peripheral devices that are both connectable to and detachable from electronic device 112. In one aspect, to connect to electronic device 112, modular components 118, 120, and 122 fit into a body or housing of electronic device 112. For example, modular component 118 connects to device 112 by fitting into slot 124, modular component 120 connects to device 112 by fitting into slot 126, and modular component 122 connects to device 112 by fitting into slot 128. In aspects of the invention, when a modular component is connected to electronic device 112, the modular component is also coupled to a form factor of electronic device 112. Modular component 118 is detachable from and slides out of slot 124, modular component 120 is detachable from and slides out of slot 126, and modular component 122 is detachable from and slides out of slot 128. While slots 124, 126, and 128 include sizes and shapes that correspond to the respective modular component, in aspects of the invention slots 124, 126, and 128 include whatever size and shape facilitates docking of a respective modular component. In other aspects, modular components are connectable to electronic device 112 by alternative means, such as by tethering to electronic device 112.

Modular components 118, 120, and 122 function when detached from electronic device 112. For example, where modular component 118 represents a wireless headset of a mobile telecommunications device, the wireless headset functions when detached from the mobile telecommunications device and positioned by a user. In another example, where modular component 122 represents a miniremote of a laptop computing device, the miniremote functions when removed from slot 128. Accordingly, in aspects of the invention modular components 118, 120, and 122 require a separate power source, e.g., battery, for providing power to modular components 118, 120, and 122 when detached from electronic device 112. FIG. 1 represents an exemplary embodiment where modular component 118 includes battery 130, modular component 120 includes battery 132, and modular component 122 includes battery 134. As previously explained with reference to primary battery 114, batteries 130, 132, and 134 are each linked to a separate power level icon. Battery 130 is linked to power level icon 136; battery 132 is linked to power level icon 138; and battery 134 is linked to power level icon 140.

In aspects of the invention, primary battery 114 and modular component batteries 130, 132, and 134 are connectable to one another to enable transfer of power between the batteries. FIG. 1 shows links 141, 142, 144, and 146 inside electronic device 112, through which various components might be connected. Links 141, 142, 144, and 146 join at power control component 148, which functions to direct power transfer between components. For example, primary battery 114 connects to power control component 148 by link 141 and can then be linked to modular component 120 by link 142 when modular component 120 is coupled in slot 126. Primary battery 114 is likewise linked to battery 132 of modular component 120 when modular component 120 is positioned in slot 126.

In further embodiments, primary battery 114 functions to transfer power to batteries 130, 132, and 134, such as when modular components 118, 120, and 122 are coupled to electronic device 112. Such a power transfer from primary battery 114 generally occurs after power levels of batteries 130, 132, and 134 are at least partially depleted due to use of modular components 118, 120, and 122. For example, where modular component 120 is detached from electronic device 112 and used, battery 132 provides necessary power to modular component 120. Accordingly, a power level of battery 132 (as depicted by power level icon 138) is partially depleted. After using modular component 120 and at least partially depleting the power level of battery 132, modular component 120 can be coupled to electronic device 112 by insertion into slot 126. Inserting modular component 120 into slot 126 provides storage of modular component 120 and enables primary battery 114 to recharge battery 132 by transferring power to battery 132.

In other embodiments, batteries 130, 132, and 134 are also capable of transferring power to primary battery 114. For example, power level icon 116 depicts primary battery 114 as having a partially depleted power level, and power level icon 136 portrays battery 130 as having a full power level. In such a circumstance, battery 130 might recharge primary battery 114 by transferring power to primary battery 114 when modular component 118 is positioned in slot 124.

As previously indicated, primary battery 114 and batteries 118, 120, and 122 are rechargeable, such that they each have a maximum battery life equal to a maximum duration within which the battery can provide power without needing to be recharged. A rechargeable battery might perform less effectively if it is repeatedly recharged after being only partially discharged or if it is repeatedly over-charged. Accordingly, aspects of the present invention are directed to maintaining battery effectiveness.

In one embodiment, power stored in primary battery 114 is discharged in an accelerated fashion below a threshold, which is established to prevent memory effect. Once a power level of primary battery 114 is discharged below the threshold, primary battery 114 is recharged. A threshold is indicated on power level icon 116 by threshold mark 152. As batteries can experience negative effects by being discharged below a safe power level, in aspects of the invention the threshold (below which primary battery 114 is discharged) is above the safe power level. For example, in reference to power level icon 116, a safe power level might be any power level above 25% (one shaded box).

Power might be discharged from primary battery 114 in a variety of ways, such as by performing operations over and above regular functions of electronic device 112. In this respect, discharging of primary battery 114 is actually accelerated as compared to regular usage of electronic device 112. Various extraneous functions might be performed to accelerate discharging of primary battery 114. Examples of extraneous functions include running streaming video, illuminating a light, displaying a message, running a heat sink, emitting sound at an audible or inaudible frequency, and transferring power from primary battery 114 to one or more other batteries 118, 120, and 122. FIG. 1 depicts an exemplary embodiment of the present invention in which speaker 150 emitting sound. In other embodiments, a set of extraneous functions might be executed simultaneously to facilitate faster discharge of power.

In some embodiments, extraneous functions are set to be carried out in an order. For example, a first extraneous function might include transferring power from primary battery 114 to one or more other batteries 118, 120, and 122. However, a circumstance might arise where all batteries 118, 120, and 122 are at full capacity and cannot store any additional power. In that case, a second extraneous function might include illuminating a light. In aspects of the technology, an order in which extraneous functions are to be carried out is customizable by a user of electronic device 112. For example, a user might prefer to have nonaudible sound emitted, rather than a light illuminated. However, to facilitate faster discharge, a user might select multiple extraneous functions to be carried out at the same time.

In further aspects, discharge of a primary battery 114 is accelerated upon the occurrence of an event. In some embodiments, such an event is programmed so as not to interfere with usage of electronic device 112. Therefore, one event might include a detected period of nonusage of electronic device 112, such as where neither the electronic device nor any of its modular components are in use. Another event includes a period of usage-downtime of electronic device 112, such as might be determined by monitoring usage patterns of the electronic device. For example, if the electronic device is consistently not in use for 8 hours from 10:00 PM until 6:00 AM, that period of time might be set as a period of usage-downtime during which power can be discharged. An alternative event might include a scheduled discharge, such as one that is set by input from a user or that is set as a default in computing device 112. Moreover, an event might include expiration of a time period. For example, primary battery 114 might be scheduled to discharge every 30 days, such that expiration of 30 days triggers acceleration of discharging. A common practice of users of electronic device 112 is to use electronic device 112 throughout the day and then plug electronic device 112 into an outlet for charging at night during a period of nonusage. As such, this period of nonusage during which the electronic device 112 is plugged into an outlet represents a logical opportunity to accelerate discharge of primary battery 114 prior to recharging. In some embodiments, the above examples of events are combined in order to program accelerated discharge. For example, an event might be programmed to occur both at the expiration of every 30 days and during a period of usage downtime.

Once a power level of primary battery 114 is discharged below a threshold, primary battery 114 is recharged by transferring power back into primary battery 114 from a power source. A power source might include various types such as a power cord of electronic device 112 plugged into a power outlet and another battery, such as batteries 130, 132, and 134.

In further aspects of the invention, a GUI is displayed during acceleration of discharge to indicate that the acceleration is taking place. The GUI might provide additional information, such as which extraneous function is being performed and how long the accelerated discharge period is estimated to last. Furthermore, the GUI might enable a user to provide input to electronic device 112 to modify the accelerated discharge, such as by changing the duration, switching to an alternative extraneous function, or canceling the accelerated discharge.

While specific reference is made to primary battery 114 to describe accelerating discharging of a battery, embodiments of the invention also include accelerating discharge of batteries 130, 132, and 134. For example, when modular component 118 is coupled to electronic device 112, power control component 148 might accelerate discharge from battery 130. In one aspect, power is discharged from battery 130 and transferred to one or more of primary battery 114 and batteries 132 and 134. In another aspect, power from battery 130 is used to execute an extraneous function.

As previously described, modular components 118, 120, and 122 are accessory devices, which provide varying functionality to electronic device 112. Because each modular component 118, 120, and 122 performs a different function, it is likely that each modular component requires varying amounts of power to function as compared to other modular components. Usage frequency of a modular component is one factor that influences power required to operate a modular component. For example, modular component 118 might represent a wireless headset that is used on a regular basis, such that modular component 118 requires a high amount of power. On the other hand, modular component 122 might represent a miniremote that has never been used, such that modular component 122 requires very little power. In other aspects, where two modular components performing different functions are operated for the same amount of time, one function might use more power while being performed than a different function. All of these factors weigh into power requirements of each modular component 118, 120, and 122.

In aspects of the technology, power requirements of each modular component 118, 120, and 122 are measured and compared, which assists in determining which of the modular component 118, 120, and 122 has the highest power requirement. Accordingly, modular components 118, 120, and 122 can be ranked in an order from highest power requirement to lowest power requirement. For example, where modular component 118 includes a headset with a higher power requirement than modular component 122, which includes a miniremote, modular component 118 is ranked higher in order than modular component 122. In an alternative aspect, input from a user customizes an order of modular components. For example, if a user is currently utilizing, or anticipates heavy usage of, a speaker pod, the user might customize the order of modular components so that the speaker pod has a higher rank.

In further embodiments, an order of modular components 118, 120, and 122 from highest power requirement to lowest power requirement is used to prioritize modular components 118, 120, and 122 for distribution of power. Such an order of priority might be referenced under various conditions of electronic device 112, such as where an electronic device 112 is not plugged into an outlet and has a limited power supply. For example, if modular component 118 is ranked higher in order than modular component 122 (i.e., modular component 118 includes higher power requirements than modular component 122 or user input ranked modular component 118 higher), in aspects of the invention power will be transferred from primary battery 114 to modular component 118 before it is transferred to modular component 122. In a further embodiment, priority is used where batteries 130, 132, and 134 are used to recharge primary battery 114. For example, if modular component 118 is ranked higher in order than modular component 122, in aspects power will be transferred from battery 134 of modular component 122 to primary battery 114 before it is transferred from battery 130 of modular component 118.

In an aspect of the present invention, an order of priority among modular components 118, 120, and 122 is utilized when power is discharged in an accelerated fashion (as previously described). For example, modular component 118 might have a highest power requirement. Accordingly, when power is discharged from primary battery 114 in an accelerated fashion by transferring power to other batteries, power is transferred first to modular component 118, and then to the modular component with the second highest power requirement.

In another embodiment of the present invention, an order or priority among modular components 118, 120, and 122 is utilized to distribute power between one another. For example, modular component 118 might have a highest power requirement, modular component 120 might have a second highest power requirement, and modular component 122 might have a lowest power requirement. Accordingly, when battery 130 of modular component 118 needs to be recharged, power is transferred first from battery 132 of modular component 122 before power is transferred from battery 132 of modular component 120.

Figure 2:
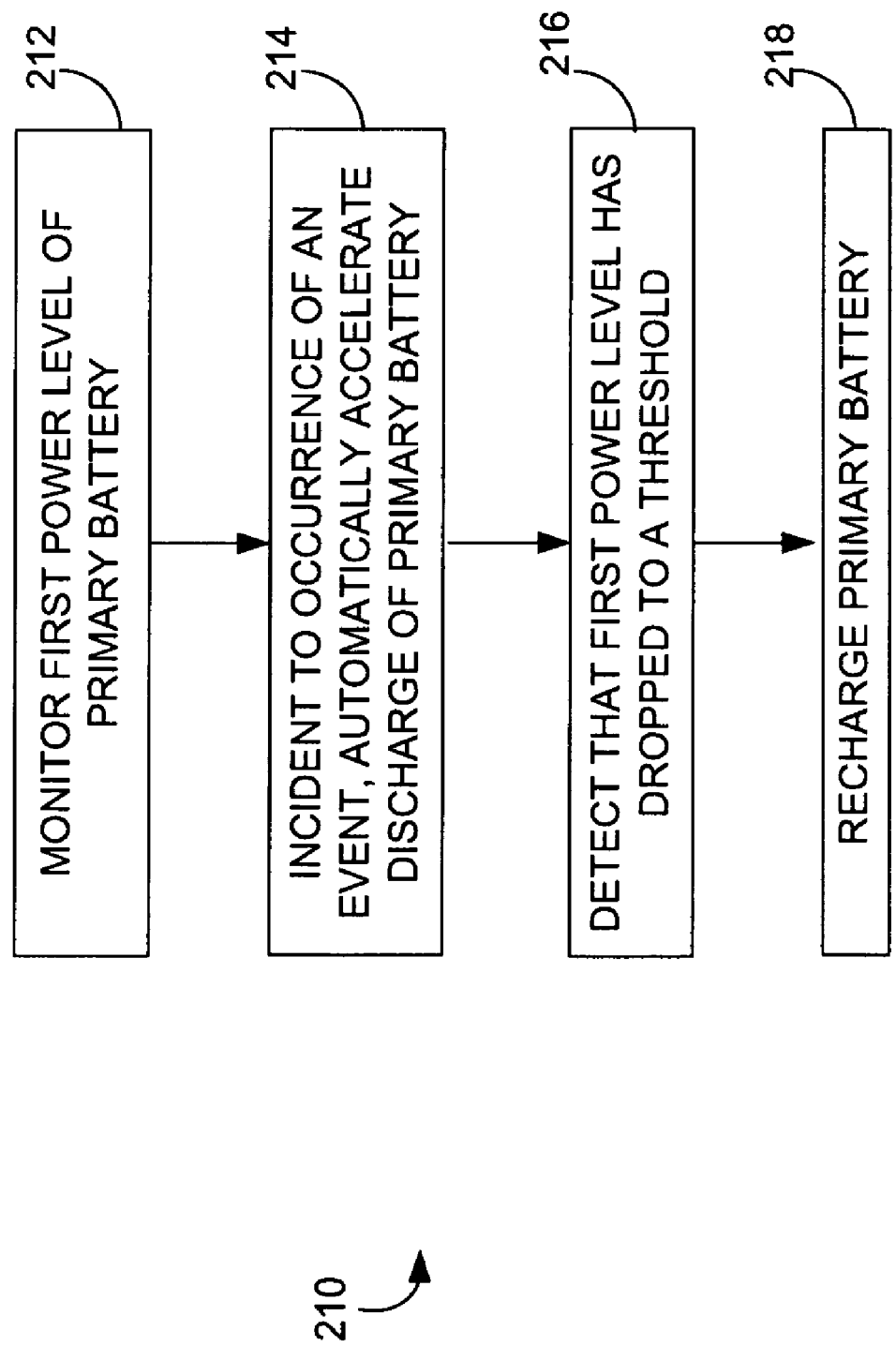
FIGS. 2-4 depict illustrative methods for regulating power in accordance with embodiments of the present invention.

Referring now to FIG. 2, a method in accordance with the present invention is shown and is identified generally by numeral 210. Method 210 is directed to managing power of an electronic device that includes a primary battery. According to method 210, step 212 includes monitoring a first power level of a primary battery. For example, a power level of primary battery 114 (as depicted by power level icon 116) might be monitored. At step 214, incident to occurrence of an event, discharge of the primary battery is automatically accelerated. For example, discharge might be automatically accelerated by performing one or more extraneous functions, such as running streaming video, turning on a light, displaying a message, running a heat sink, transmitting sound at an audible frequency, transmitting sound at a nonaudible frequency, and transferring power from the primary battery to one or more other batteries. Step 216 includes detecting that the first power level has dropped to a threshold, such as a level that is designed to condition a battery for higher storage capacities. Furthermore, at step 218 the primary battery is recharged.

Figure 3:
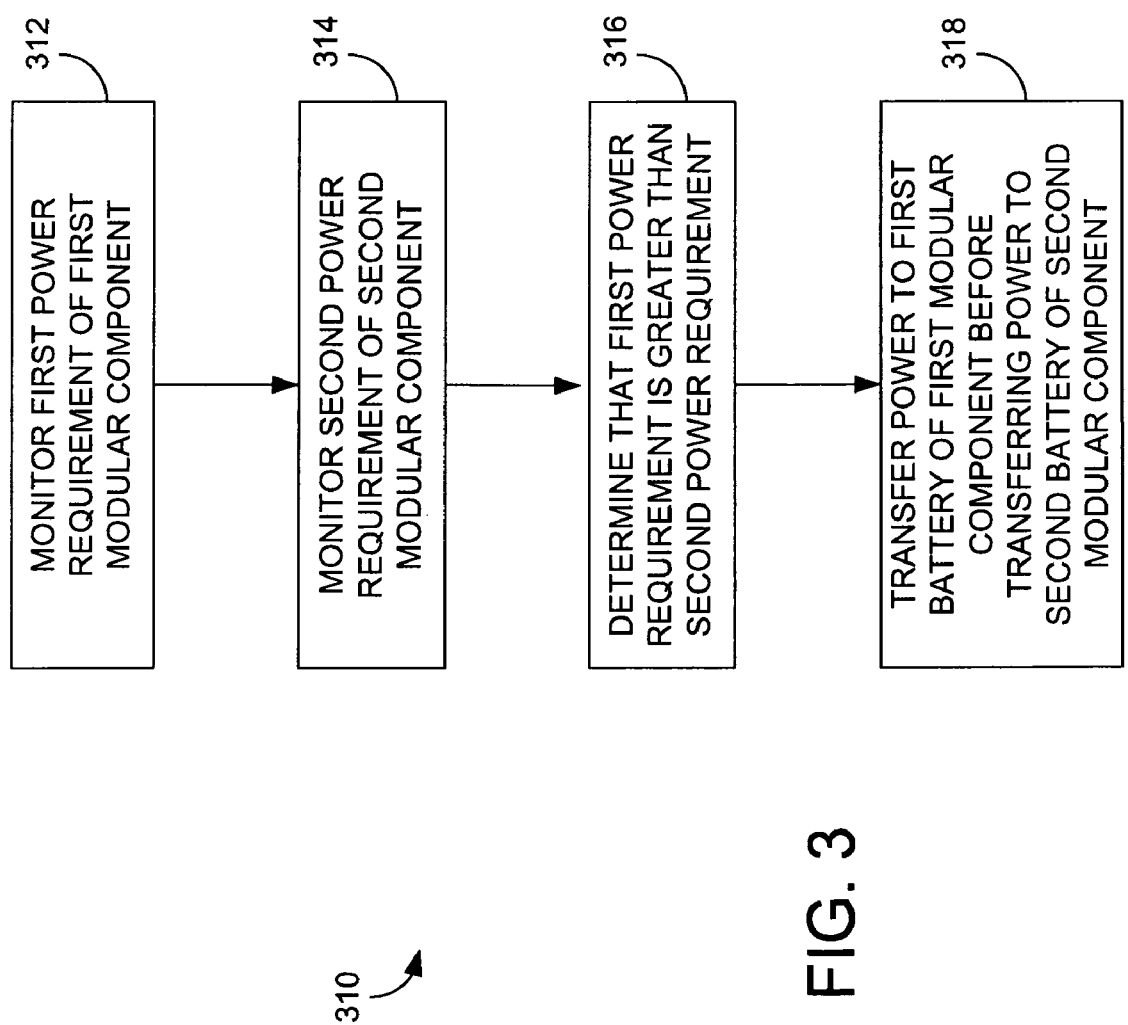

Referring now to FIG. 3, another method in accordance with an embodiment of the present invention is depicted and identified generally by the numeral 310. Method 310 is directed to managing power of an electronic device that includes a primary battery and that is adapted to be coupled to one or more modular components. Step 312 includes monitoring a first power requirement of a first modular component. For example, power requirements of modular component 118 (e.g., wireless headset) might be monitored. Step 314 includes monitoring a second power requirement of a second modular component. At step 316, a determination is made that the first power requirement is greater than the second power requirement. Furthermore, step 318 includes transferring power to the first modular component battery before transferring power to the second modular component battery.

Figure 4:
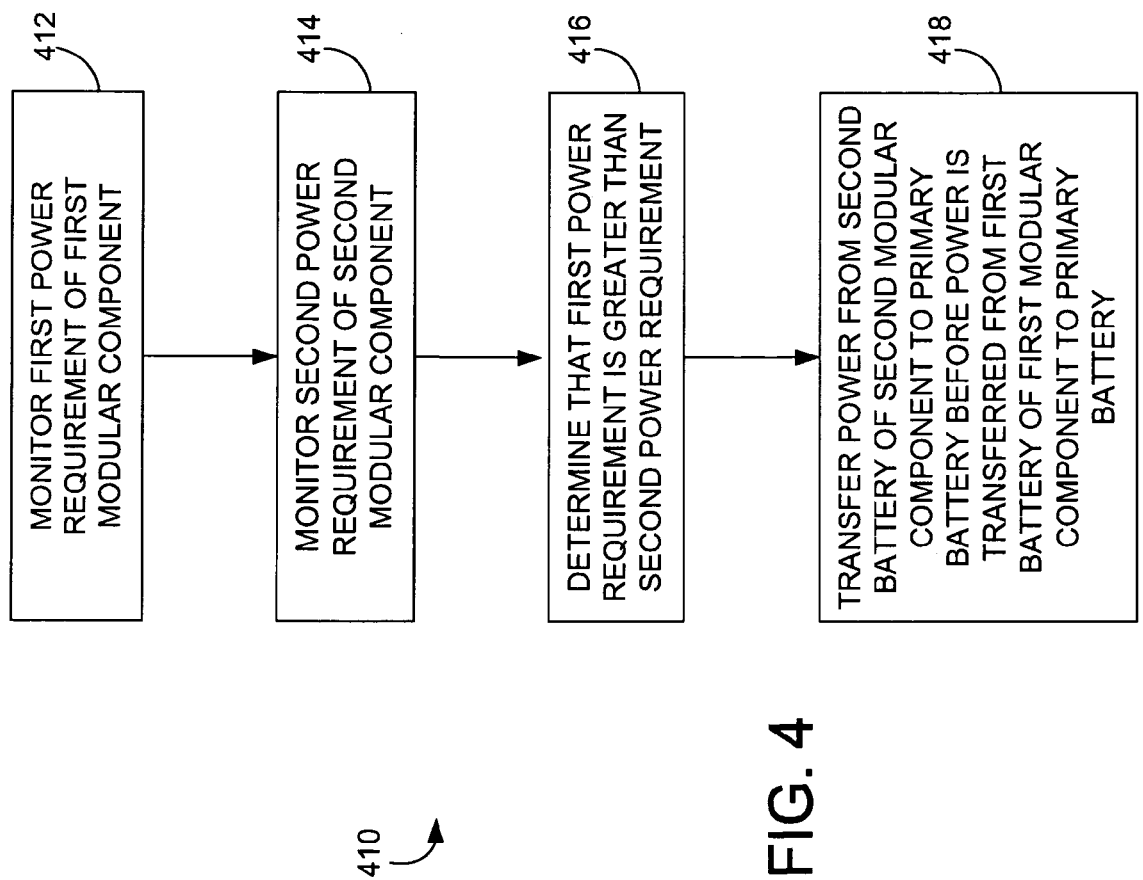

Referring now to FIG. 4, another method in accordance with an embodiment of the present invention is depicted and identified generally by numeral 410. Method 410 is also directed to managing power of an electronic device that includes a primary battery and that is adapted to be coupled to one or more modular components. Step 412 includes monitoring a first power requirement of a first modular component. Step 414 includes monitoring a second power requirement of a second modular component. At step 416, a determination is made that the first power requirement is greater than the second power requirement. Furthermore, step 418 includes transferring power from the second battery of the second modular component to the primary battery before power is transferred from the first battery of the first modular component to the primary battery.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art (after reading this disclosure) that do not depart from its scope. A skilled artisan, based on reading this disclosure, might develop alternative means of implementing the aforementioned improvements without departing from the scope of the present invention.

Certain features and subcombinations are of utility and may be employed without reference to other features and subcombinations and are contemplated within the scope of the claims. Not all steps listed in the various figures need be carried out in the specific order described.

The invention claimed is:

1. Non-transitory computer-readable media having computer-useable instructions embodied thereon for performing a method of managing power of an electronic device that includes a primary battery and that is adapted to be coupled to one or more modular components, the method comprising:
    monitoring a first power requirement of a first modular component that carries out a first function, the first modular component comprising a first battery that powers the first modular component, wherein the first power requirement is determined based on a usage frequency of the first modular component;
    monitoring a second power requirement of a second modular component that carries out a second function, the second modular component comprising a second battery that powers the second modular component, wherein the second power requirement is determined based on a usage frequency of the second modular component;
    comparing the first power requirement to the second power requirement to determine that the first power requirement is greater than the second power requirement; and
    when at least the first battery is less than full capacity, transferring power to the first battery before transferring power to the second battery based on the first power requirement being greater than the second power requirement.

2. The media of claim 1 wherein the first modular component comprises one or more of a wireless input device and a wireless output device and wherein the second modular component comprises one or more of a wireless input device and a wireless output device.

3. The media of claim 2 wherein the wireless input device comprises one or more of a mouse, keyboard, remote control, microphone, headset, and stylus.

4. The media of claim 2 wherein the wireless output device comprises a wireless speaker.

5. The media of claim 1 further comprising:
    creating a charging order wherein the first modular component is associated with a higher charging priority than the second modular component; and
    referencing the charging order before transferring power to one or more of the first battery and the second battery.

6. The media of claim 5 wherein the charging order is modifiable by input from a user of the electronic device.

7. A method of managing power of an electronic device that includes a primary battery and that is adapted to be coupled to one or more modular components, the method comprising:

monitoring by a power control component of the electronic device a first power requirement of a first modular component that carries out a first function, the first modular component comprising a first battery that powers the first modular component, wherein the first power requirement is determined based on a usage frequency of the first modular component;

monitoring by the power control component a second power requirement of a second modular component that carries out a second function, the second modular component comprising a second battery that powers the second modular component, wherein the second power requirement is determined based on a usage frequency of the second modular component;

comparing by the power control component of the electronic device the first power requirement to the second power requirement to determine that the first power requirement is greater than the second power requirement; and when at least the first battery is less than full capacity, routing by the power control component power to the first battery before transferring power to the second battery based on the first power requirement being greater than the second power requirement.

* * * * *